United States Patent
Holle et al.

(10) Patent No.: US 7,574,613 B2
(45) Date of Patent: Aug. 11, 2009

(54) SCALING IDLE DETECTION METRIC FOR POWER MANAGEMENT ON COMPUTING DEVICE

(75) Inventors: Matthew H. Holle, Kirkland, WA (US); Allen Marshall, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 11/481,652

(22) Filed: Jul. 6, 2006

(65) Prior Publication Data

US 2007/0220289 A1 Sep. 20, 2007

Related U.S. Application Data

(60) Provisional application No. 60/782,589, filed on Mar. 14, 2006.

(51) Int. Cl.
*G06F 1/32* (2006.01)
*G06F 1/00* (2006.01)

(52) U.S. Cl. .................. 713/300; 713/310; 713/320; 713/321; 713/322; 713/323; 713/324; 713/330; 713/340; 713/400; 713/401; 713/500; 713/501

(58) Field of Classification Search .............. 713/300, 713/310, 320–324, 330, 340, 400, 401, 500–501
See application file for complete search history.

(56) References Cited

U.S. PATENT DOCUMENTS

| 5,493,670 | A | 2/1996 | Douglis et al. ............... 395/750 |
|---|---|---|---|
| 5,745,375 | A | 4/1998 | Reinhardt et al. ........... 364/492 |
| 5,758,133 | A * | 5/1998 | Evoy ........................... 713/501 |
| 6,885,974 | B2 | 4/2005 | Holle .......................... 702/182 |
| 6,901,524 | B2 * | 5/2005 | Watts, Jr. .................... 713/322 |
| 7,219,245 | B1 * | 5/2007 | Raghuvanshi ............... 713/322 |
| 2004/0098631 | A1 * | 5/2004 | Terrell, II .................... 713/322 |

OTHER PUBLICATIONS

Poellabauer, C. et al., "Energy-Aware Traffic Shaping for Wireless Real-Time Applications", *Proceedings of 10th IEEE Real-Time and Embedded Technology and Applications Symposium*, May 2004, 48-55.

* cited by examiner

*Primary Examiner*—Thomas Lee
*Assistant Examiner*—Fahmida Rahman
(74) *Attorney, Agent, or Firm*—Woodcock Washburn LLP (57) ABSTRACT

A component of a computing device such as a processor is operated based on a clock signal oscillating at a frequency. Power management for the computing device is performed by adjusting the frequency of the clock signal applied to the component when warranted and also by idling the component when the component experiences a period of inactivity longer than an idle detection metric scaled according to the adjusted frequency.

18 Claims, 3 Drawing Sheets

SCALING IDLE DETECTION METRIC FOR POWER MANAGEMENT ON COMPUTING DEVICE

CROSS REFERENCE TO RELATED APPLICATION

This application claims the benefit of U.S. Provisional Application No. 60/782,589, filed Mar. 14, 2006, hereby incorporated by reference in its entirety.

TECHNICAL FIELD

The present invention relates to power management on a computing device or the like, and specifically to an idle detection metric employed in connection with such power management to determine when a component on the computing device is to enter a heightened power saving state. In particular, the present invention relates to scaling the idle detection metric based on a current power state of the component so as to increase the likelihood that the heightened power saving state is achieved.

BACKGROUND OF THE INVENTION

As should be appreciated, a computing device such as a personal computer employs power management techniques with respect to at least some of the components thereof so as to minimize power employed during the operation of such computing device. As may be appreciated, minimizing power use in connection with such computing device represents good practice, even when power use is not a particular concern, such as for example may be the case with a desktop computer operating on externally supplied utility power or the like. More importantly, minimizing power use in connection with such computing device may be critical when power use is in fact a particular concern, such as for example may be the case with a laptop computer operating on internally supplied battery power or the like.

Typically, power management in a computing device is applied to one or more components of the computing device that are especially high consumers of power, although power management may be applied to any component of the computing device. Examples of high power consumption components in a computing device include the processor, the storage device (hard drive, e.g.), and the display.

Especially with regard to the processor of a computing device, power management occurs in two forms. In the first form, and bearing in mind that the processor operates according to a clock having a set frequency, power is conserved by reducing the frequency of the clock. Presumably, although reducing the frequency increases actual processor usage in a roughly inverse manner, such actual processor usage is likely not very high at any particular time, and at any rate the frequency of the clock can be increased if the actual processor usage increases precipitously.

In the second form, and bearing in mind that the processor and/or a portion thereof can at times be essentially unused, especially during times of little or no computing device activity, power is conserved by idling at least the unused portion of the processor so as to stop executing. For example, if the processor is a multi-core processor, one or more of the cores may be idled. Likewise, if the processor includes specialized portions such as math portions, logic portions, security portions, cryptography portions, or the like, such specialized portions may be idled. Similarly, the entire processor may be idled, except perhaps for some core functionality such as an interrupt section that could receive an interrupt and based thereon reactivate the processor. In any such case, the idled at least a portion of the processor may be said to be 'sleeping' until reactivated for actual processing tasks.

As may be appreciated, as between frequency reduction and idling, frequency reduction results in relatively lesser power savings, while idling results in relatively greater power savings, at least on an instantaneous basis. Notably, both forms of power management may be employed together to reduce overall power consumption of the processor. In particular, during the course of operating the processor, power management is performed to adjust the frequency of the clock based on processor usage and/or other factors, and also to idle at least a portion of the processor whenever processor usage and/or other factors so allow. Particularly with regard to the idling, such idling is performed based on the occurrence of some predetermined idle detection metric. For example, such idle detection metric may be a predefined period of processor inactivity, such as a millisecond, a tenth of a second, or a second of inactivity, or the like.

However, and significantly, it is to be appreciated that as the frequency of the clock is reduced and the actual processor usage correspondingly increases, the likelihood that the processor or at least a portion thereof becomes inactive and can be idled is reduced. That is, as the frequency of the clock decreases, the actual processor usage correspondingly increases, and periods of processor inactivity typically become smaller, and likely less than the predetermined idle detection metric. As a result, although the relatively lesser power savings from frequency reduction are achieved, the relatively greater power savings from idling are not likewise achieved. Accordingly, a need exists for a method and mechanism by which the amount of idling of the processor can be increased so as to achieve the relatively greater power savings from idling. In particular, a need exists for a method and mechanism by which the idle detection metric can be scaled according to the frequency of the clock so as to increase the likelihood that the idle detection metric is met, the processor is thereby idled more often, and the relatively greater power savings from idling are likewise achieved more often.

SUMMARY OF THE INVENTION

The aforementioned need is satisfied by the present invention in which a method is provided to perform power management on a component of a computing device. The component is operated based on a clock signal oscillating at a frequency, and the method comprises adjusting the frequency of the clock signal applied to the component when warranted and also idling the component when the component experiences a period of inactivity longer than an idle detection metric scaled according to the adjusted frequency.

In particular, to adjust the frequency of the clock signal, a maximum frequency of the clock signal and a maximum idle detection metric are obtained and the component is monitored. At some point, it is determined from the monitored component that the frequency of the clock signal can be adjusted to a resulting frequency that is reduced as compared to the maximum frequency, and the resulting frequency is determined.

The resulting frequency is applied to the clock signal, and the scaled idle detection metric is adjusted based on the resulting frequency of the clock signal such that the scaled idle detection metric bears a corresponding relationship with the resulting frequency of the clock signal and is reduced as compared to the maximum idle detection metric. Thus, the component is more likely to be idled based on the scaled and reduced idle detection metric even though the component is more likely to experience shorter periods of inactivity when the frequency of the clock signal is reduced.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
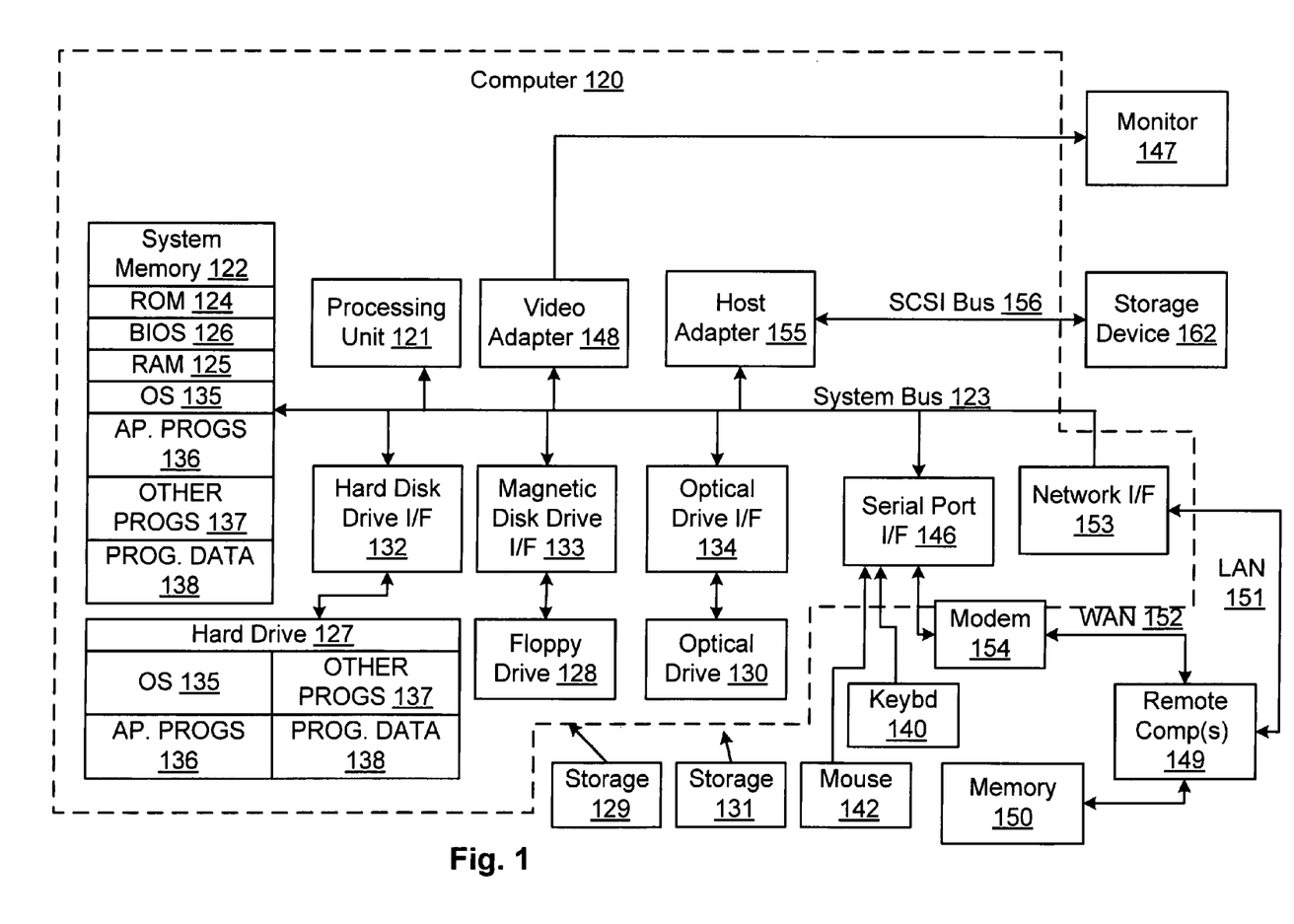
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Power Management on a Computing Device

Figure 2:
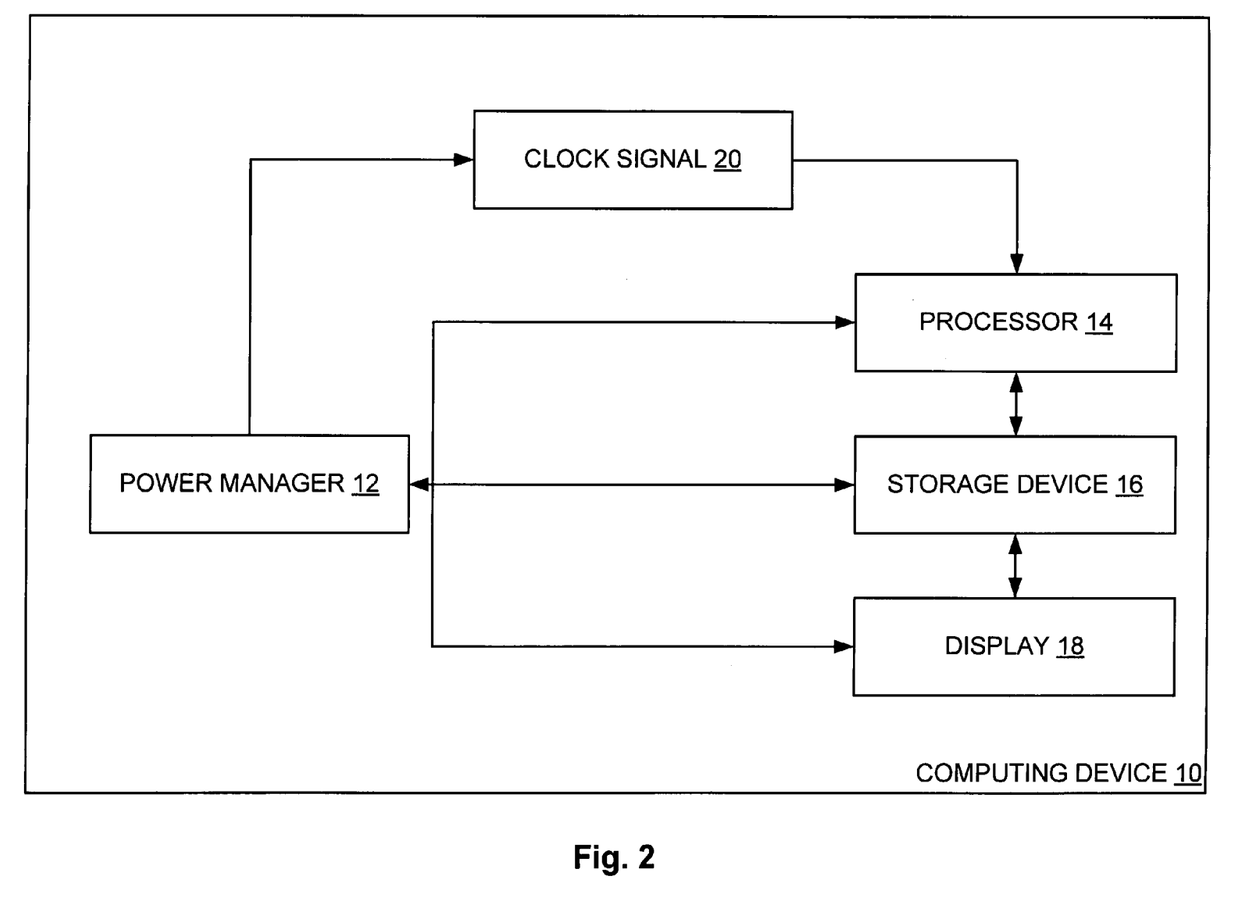
FIG. 2 is a block diagram showing a computing device with a power manager for performing power management with regard to one or more components of the computing device in accordance with embodiments of the present invention.

Turning now to FIG. 2, it is seen that a computing device 10 such as a personal computer employs power manager 12 to manage at least some of the components thereof so as to minimize power employed during the operation of such computing device 10. Typically, and as was set forth above, power management is applied by the power manager 12 in the computing device 10 to one or more components of the computing device 10 that are especially high consumers of power, such as the processor 14, the storage device (hard drive, e.g.) 16 and/or controller thereof, and the display 18 and/or controller thereof and/or the graphics processor therefor.

Note that the power manager 12 may be a separate physical component or may be integrated into another component without departing from the spirit and scope of the present invention. For example, the power manager 12 may be part of the processor 14 (not shown), and may be embodied as hardware or software within such processor 14. Such a power manager 12 is in general known or should be apparent to the relevant public, and therefore need not be set forth herein in any detail other than that which is provided.

Especially with regard to the processor 14 of the computing device 10, the power manager 12 performs power management based on frequency reduction and idling. With regard to frequency reduction, and as was set forth above, it is to be appreciated that the processor 14 operates according to an oscillating clock signal 20 at some frequency, where each oscillation of the clock signal 20 at the frequency in effect is a clock cycle during which the processor 14 performs a set amount of processing work. Note here that the clock signal 20 may be supplied by a clock of the computing device 10, or may be derived based on some signal as supplied by such a clock. As may be appreciated, the amount of processing work performed by the processor 14 per unit of time at least roughly corresponds to the frequency of the clock signal 20. Thus, if the processor performs X amount of processing work based on the clock signal 20 oscillating at frequency Y, then the processor should at least roughly perform 0.75X amount of processing work based on the clock signal 20 oscillating at frequency 0.75Y.

Correspondingly, and as may also be appreciated, the amount of time required by the processor 14 to perform a set amount of processing work is at least roughly inversely proportional to the frequency of the clock signal 20. Thus, if the processor performs a set amount of processing work in time T based on the clock signal 20 oscillating at frequency Y, then the processor should at least roughly perform the set amount of processing work in time 2T based on the clock signal 20 oscillating at frequency 0.5Y.

All that said, in frequency reduction, the power manager 12 conserves power by reducing the frequency of the clock signal 20 to some predetermined value. Although reducing the frequency of the clock signal 20 increases the amount of time that the processor 14 employs to perform a set amount of work, it is expected that overall power is reduced based on ancillary benefits which are generally known and generally need not be set forth herein in any detail. Principally, a lower frequency allows the processor 14 to be run at a lower voltage, and such lower voltage results in less power being consumed by the processor 14. Notably, the increased amount of time that the processor 14 employs to perform a set amount of work likely does not adversely affect overall performance of the processor 14, especially inasmuch as the processor 14 likely has excess processing capacity at any particular time, and at any rate the frequency of the clock signal 20 can be increased if performance decreases precipitously due to processing increased activity or the like.

With regard to idling, it is to be remembered that the processor 14 or a portion thereof can at times be essentially unused, especially during times of little or no computing device activity. Accordingly, the power manager 12 can conserve power by idling at least a portion of the processor 14 so as to stop executing. Such idling may be achieved in any appropriate manner without departing from the spirit and scope of the present invention, as long as such idling results in the expected power conservation. For example, if the processor 14 is a multi-core processor, one or more of the cores may be idled. Likewise, if the processor 14 includes specialized portions such as math portions, logic portions, security portions, cryptography portions, or the like, one or more of such specialized portions may be idled. Most typically, though, the entire processor 14 may be idled, except perhaps for some core functionality such as an interrupt section that could receive an interrupt and based thereon reactivate the processor 14.

Actual idling of the processor 14 may itself take any appropriate form without departing from the spirit and scope of the present invention. For example, such actual idling may be achieved by removing the oscillating clock signal 20 as applied to the processor 14, or by disconnecting or reducing the power to the processor 14. In any such case, the idled at least a portion of the processor 14 may be said to be 'sleeping' until reactivated for actual processing tasks. Such reactivation is known or should be apparent to the relevant public and therefore need not be set forth herein in any detail except that which is provided.

Scaling Idle Detection Metric

As was set forth above, the power manager 12 by performing frequency reduction on the processor 14 achieves a relatively lesser power savings. Correspondingly, by performing idling on the processor 14, the power manager 12 achieves a relatively greater power savings, at least on an instantaneous basis. Accordingly, and in one embodiment of the present invention, the power manager 12 is operated to maximize idling of the processor 14 so as to obtain the relatively greater power savings.

Typically, the power manager 12 employs both frequency reduction and idling on the processor 14 to reduce overall power consumption thereby. In particular, during the course of operating the processor, the power manager 12 adjusts the frequency of the clock signal 20 based on processor usage and/or other factors, and in addition the power manager 12 idles at least a portion of the processor 20 whenever processor usage and/or other factors so allow. Particularly with regard to the idling, such idling is performed based on the occurrence of some predetermined and static idle detection metric. For example, such idle detection metric may be a predefined period of processor inactivity, such as a millisecond, a tenth of a second, or a second of inactivity, or the like. Thus, the power manager 12 monitors the processor 14 for such a period of inactivity as defined by the predetermined idle detection metric, and if the period of inactivity is in fact detected, the power manager 12 idles the processor 14 by causing such processor 14 to appropriately enter into an idle mode.

Notably, though, if the predetermined and static idle detection metric is poorly set, the power manager 12 may unwittingly favor frequency reduction over idling, even though the power manager 12 should in fact favor idling over frequency reduction so as to maximize power savings. In particular, and assuming that the power manager 12 is performing frequency reduction and idling in parallel and as appropriate, it can be the case that as the frequency of the clock signal 20 is reduced, the processor 14 becomes so busy that no period of inactivity as defined by the set idle detection metric is detected by such power manager 12. That is, as the frequency of the clock signal 20 is decreased by the power manager 12, actual usage by the processor 14 correspondingly increases, and periods of inactivity of the processor 14 typically become smaller, and likely less than the set idle detection metric.

To summarize, then, while reducing frequency saves power, reduced-frequency operation of the processor 14 also reduces the number of periods of inactivity and the lengths thereof, with the result being that the set idle detection metric is not met and the processor 14 is not idled in any significant manner, if at all. As a result, although the power manager 12 achieves the relatively lesser power savings from frequency reduction, such power manager 12 does not achieve the relatively greater power savings from idling. Consider a scenario where a power manager 12 and processor 14 where the processor 14 must accumulate 100 ms of continuous idle time (i.e., the set idle detection metric is 100 ms) before the power manager 12 idles such processor 14. Now assume that the power manager 12 reduces the frequency of the clock signal 20 by 50 percent, say from 1 GHz to 500 MHz. By reducing the frequency by half, the processor 14 at least theoretically takes twice as long to complete each task. Thus, the workload of the processor has doubled, and the likelihood of accumulating 100 ms of continuous idle time is reduced, perhaps considerably.

As may be appreciated, then, the root of the problem is that the idle detection metric is not adjusted based on adjustments in the frequency of the clock. Accordingly, in one embodiment of the present invention, the power manager 12 scales the idle detection metric according to the frequency of the clock signal 20, as will be set forth in more detail below. Thus, as the power manager 12 reduces the frequency of the clock signal 20 and usage of the processor 14 thereby increases, the power manager 12 also reduces the idle detection metric to increase the likelihood that the processor 14 will at least occasionally be idled based on a detected period of inactivity meeting the (scaled) idle detection metric. Similarly, as the power manager 12 increases the frequency of the clock signal 20 and usage of the processor 14 thereby decreases, the power manager 12 also increases the idle detection metric.

Notably, the power manager 12 may scale the idle detection metric according to the frequency of the clock signal 20 in any appropriate manner without departing from the spirit and scope of the present invention. For example, it may be the case that the idle detection metric and the frequency are scaled in a proportional manner. Thus, if the maximum frequency of the clock signal 20 is X and a maximum idle detection metric at the maximum frequency is defined to be Y, then the idle detection metric is scaled to 90 percent of Y when the frequency is reduced/scaled to 90 percent of X, the idle detection metric is scaled to 80 percent of Y when the frequency is reduced to 80 percent of X, etc:

% scaling of max idle detection metric=% scaling of max frequency

Similarly, it may be the case that the idle detection metric and the frequency are scaled in a proportionally squared manner. Thus, and again, if the maximum frequency of the clock signal 20 is X and the maximum idle detection metric at the maximum frequency is defined to be Y, then the idle detection metric is scaled to 81 percent of Y when the frequency is reduced/scaled to 90 percent of X, the idle detection metric is scaled to 64 percent of Y when the frequency is reduced to 80 percent of X, etc.

% scaling of max idle detection metric=(% scaling of max frequency)$^2$

Revisiting the above scenario, consider now a power manager 12 and processor 14 where the processor 14 must accumulate 100 ms of continuous idle time (i.e., the set idle detection metric is 100 ms) when the frequency of the clock signal 20 is at a maximum of 1 GHz before the power manager 12 idles such processor 12, and again assume that the power manager 12 reduces the frequency of the clock signal 20 by 50 percent, say from 1 GHz to 500 MHz. Once more, by reducing the frequency by half, the processor 14 at least theoretically takes twice as long to complete each task, and the workload of the processor has doubled. However, in the case where the power manager 12 proportionally scales the idle detection metric, such metric is now 50 ms (i.e., half, as with the frequency), and the likelihood of accumulating 50 ms of continuous idle time is of course better than the likelihood of accumulating 100 ms of continuous idle time. As a result, the likelihood of the power manager 12 idling the processor increases considerably, as does the corresponding power savings.

Moreover, in the case where the power manager 12 scales the idle detection metric according to the square of the percentage scaling of the maximum frequency, such metric is now 25 ms (i.e., half squared times 100 ms or 0.5*0.5*100 ms), and the likelihood of accumulating 25 ms of continuous idle time is of course better than the likelihood of accumulating 50 or 100 ms of continuous idle time. As a result, the likelihood of the power manager 12 idling the processor increases even more considerably, as does the corresponding power savings.

As may be appreciated, the actual method of scaling the idle detection metric, be it proportional, squared proportional, etc., may be chosen from among any scaling method without departing from the spirit and scope of the present invention. Moreover, such method may be chosen based on any criteria, and according to any methodology, including scientific and empiric observation. Thus, it may for example be the case that the actual method of scaling is chosen based on a blind estimate, or based on experimentation, or even based on some targeted amount of idling of the processor 14 under some given set of circumstances.

At any rate, and turning now to FIG. 3, with such actual method of scaling the idle detection metric chosen, the power manager 12 generally operates in the following manner. Preliminarily, the power manager 12 is supplied with relevant information including the maximum frequency of the clock signal 20 and the maximum idle detection metric, among other things (step 301). Thereafter, the power manager 12 proceeds by monitoring the operation of the processor 14 (step 303). Note here that the monitoring of the processor 14 may comprise monitoring of any appropriate statistics relating to the operation of the processor without departing from the spirit and scope of the present invention. For example, the power manager 12 may monitor statistics relating to usage of the processor 14.

At some point, based on the monitored operation of the processor 14, the power manager may determine that the frequency of the clock signal 20, which is providing the oscillating signal to the processor 14, may be altered to some percentage of the maximum value of such frequency or the like (step 305). Such determination may be arrived at based on any appropriate decision process without departing from the spirit and scope of the present invention. For example, such determination may be made based on an observation that the usage of the processor 14 has fallen below a predetermined value for a predetermined period of time.

At any rate, based on such determination, the power manager 12 calculates or otherwise determines the percentage of the maximum value of such frequency and the resulting frequency (step 307), and in fact applies such resulting frequency to the clock signal 20 (step 309). Such calculating or determining and applying may be performed in any appropriate manner without departing from the spirit and scope of the present invention. For example, such calculating may be based on a target usage for the processor 14, and such applying may be by way of loading a particular value into a register associated with the clock signal 20. Note here that the resulting frequency may be an increase or a decrease, depending on whatever the prior value may be, and assuming that the process is performed in an iterative manner. Note that adjusting the frequency of the clock signal 20 may be performed at a clock of the computing device 10 or at some other location if the clock is not adjustable.

In addition to adjusting the frequency of the clock signal 20, and in one embodiment of the present invention, the power manager also adjusts the idle detection metric employed to determine whether to idle the processor 14. In particular, and as was set forth above, based on the adjustment to the frequency of the clock signal 20, the power manager scales the idle detection metric (step 311) based on whatever idle detection metric scaling algorithm the power manager 12 employs, be it proportional, square proportional, or the like. Thereafter, at least with regard to frequency reduction, the process of steps 303-311 ends for the power manager 12. Note, though, that as was alluded to above, such process of steps 303-311 may be iteratively performed on an ongoing basis, either at some predetermine iteration rate or as needed based on changed circumstances.

Figure 3:
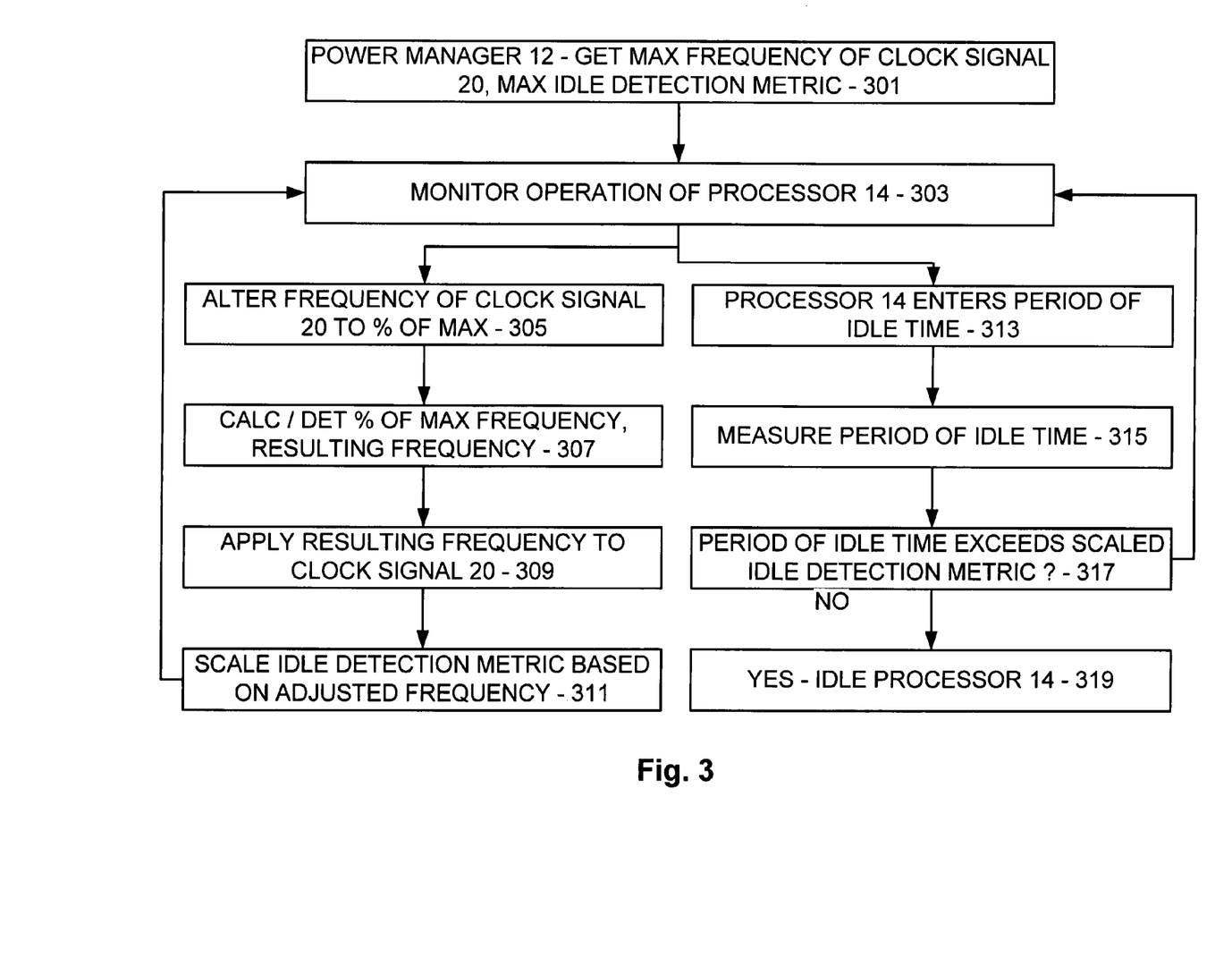
FIG. 3 is a flow diagram showing key steps performed by the power manager of FIG. 2 in accordance with embodiments of the present invention.

At any rate, and still referring to FIG. 3, it is seen that in addition to the frequency reduction (adjustment) process of steps 305-311, the power manage also periodically performs an idling detection process based on the scaled idle detection metric produced at step 311. In particular, the power manager 12 in monitoring the operation of the processor 14 as at step 303 may determine that the processor 14 has entered a period of idle time (step 313), where the processor 14 is in essence not being called upon to perform any substantive operations. Such substantive operations and by extension non-substantive operations may be defined as any appropriate operations without departing from the spirit and scope of the present invention. For example, substantive operations may be performed in response to interrupts, calls, or the like, while non-substantive operations may be administrative tasks or the like not performed in response to any such interrupts, calls, or the like.

At any rate, upon determining that the processor 14 has entered a period of idle time as at step 313, the power manager 12 then measures the period of the idle time by way of appropriate measurement tools available thereto (step 315), and upon determining that the period of idle time exceeds the scaled idle detection metric (step 317), the power manager 12 idles the processor 14 (step 319). Thereafter, at least with regard to idling, the process of steps 303 and 313-319 ends for the power manager 12. Note here that as before at least a portion of the idling process (i.e., up to step 317) may be iteratively performed on an ongoing basis, either at some predetermine iteration rate or as needed based on changed circumstances, especially if the processor 14 is not idled. As may be appreciated, if idled, the iterative idling process can be suspended until the processor 14 is reactivated.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism by which the amount of idling of the processor 14 can be increased so as to achieve the relatively greater power savings from idling. In particular, the idle detection metric is scaled according to the frequency of the clock signal 20 so as to increase the likelihood that the idle detection metric is met, the processor 14 is thereby idled more often, and the relatively greater power savings from idling are likewise achieved more often.

It should be appreciated that changes could be made to the embodiments described above without departing from the inventive concepts thereof. As but one example, although the present invention is primarily set forth in terms of scaling the idle detection metric according to the adjustable frequency of a clock signal, such scaling may alternately be performed according to other adjustable parameters as applied to the processor 14, including but not limited to the voltage supplied to the processor 14, progressive states of the processor 14, and the like. As another example, although the present invention is primarily set forth in terms of power management with regard to a processor 14, such power management may alternately be performed with regard to other adjustable components of the computing device 10, including the storage device (hard drive, e.g.) 16, the display 18 of the computing device 10, controllers, auxiliary processors, and the like.

Particularly with regard to performing power management with regard to other components of the computing device 10, it is to be appreciated that such power management may be performed based on the frequency of the clock signal 20 applied to the processor 14 or based on some other variable, but with regard to a time metric or other metric of the other component. Thus, if the overall computing device 10 is idle (i.e. the operating system operating on the processor 14 of the computing device 10 is spending the vast majority of time in an idle loop), then power time-out metrics for a variety of components of the computing device 10 could be scaled by the power manager 12 or a similar component. For example, if the computing device 10 includes a wireless network interface device which has a 60 second time-out metric before the transmit signal thereof is scaled back, and if the computing device 10 is determined to be idle according to the scaled idle detection metric of the present invention, then the time-out detection metric could also be scaled back in a proportional manner, a squared-proportional manner, etc. Similarly, other time-out metrics may also be scaled, including metrics with regard to a hard disk, a USB data bus, and other components.

It should be understood, therefore, that this invention is not limited to the particular embodiments disclosed, but it is intended to cover modifications within the spirit and scope of the present invention as defined by the appended claims.

The invention claimed is:

1. A method for performing power management on a component of a computing device, the component being operated based on a clock signal oscillating at a frequency, the method comprising adjusting the frequency of the clock signal applied to the component when warranted and also idling the component when the component experiences a period of inactivity longer than an idle detection metric scaled according to the adjusted frequency, wherein adjusting the frequency of the clock signal includes:

obtaining a maximum frequency of the clock signal and a maximum idle detection metric; monitoring the component;

determining from the monitored component that the frequency of the clock signal can be adjusted to a resulting frequency that is reduced as compared to the maximum frequency, wherein the resulting frequency is determined as a percentage of the maximum frequency of the clock signal (% of maximum frequency);

determining the resulting frequency; applying the resulting frequency to the clock signal; and adjusting the scaled idle detection metric based on the percentage of the maximum frequency that the resulting frequency of the clock signal is of the maximum frequency such that the scaled idle detection metric bears a corresponding relationship with the resulting frequency of the clock signal and is reduced as compared to the maximum idle detection metric, whereby the component is more likely to be idled based on the scaled and reduced idle detection metric even though the component is more likely to experience shorter periods of inactivity when the frequency of the clock signal is reduced as compared to the maximum frequency.

2. The method of claim 1 wherein the component is one of a processor of the computing device and a portion of the processor of the computing device.

3. The method of claim 1 comprising reducing the frequency of the clock signal applied to the component when warranted based on monitored usage of the component.

4. The method of claim 1 wherein the resulting frequency is one of an increased and a decreased frequency.

5. The method of claim 1 comprising adjusting the scaled idle detection metric to: scaled idle detection metric=% of maximum frequency*maximum idle detection metric.

6. The method of claim 1 comprising adjusting the scaled idle detection metric to: scaled idle detection metric=(% of maximum frequency)*maximum idle detection metric.

7. The method of claim 1 wherein idling the component comprises: determining that the component has entered a period of inactivity; measuring the period of inactivity; determining that the measured period of inactivity exceeds the scaled idle detection metric; and idling the component.

8. A computer-readable storage medium having stored thereon computer-executable instructions far performing a method for performing power management on a component of a computing device, the component being operated based on a clock signal oscillating at a frequency, the method comprising adjusting the frequency of the clock signal applied to the component when warranted and also idling the component when the component experiences a period of inactivity longer than an idle detection metric scaled according to the adjusted frequency, wherein adjusting the frequency of the clock signal includes:

obtaining a maximum frequency of the clock signal and a maximum idle detection metric; monitoring the component;

determining from the monitored component that the frequency of the clock signal can be adjusted to a resulting frequency that is reduced as compared to the maximum frequency;

determining the resulting frequency, wherein the resulting frequency is determined as a percentage of the maximum frequency of the clock signal (% of maximum frequency);

applying the resulting frequency to the clock signal; and adjusting the scaled idle detection metric based on the percentage of the maximum frequency that the resulting frequency of the clock signal is of the maximum frequency such that the scaled idle detection metric bears a corresponding relationship with the resulting frequency of the clock signal and is reduced as compared to the maximum idle detection metric, whereby the component is more likely to be idled based on the scaled and reduced idle detection metric even though the component is more likely to experience shorter periods of inactivity when the frequency of the clock signal is reduced as compared to the maximum frequency.

9. The medium of claim 8 wherein the component is one of a processor of the computing device and a portion of the processor of the computing device.

10. The medium of claim 8 wherein the method comprises reducing the frequency of the clock signal applied to the component when warranted based on monitored usage of the component.

11. The medium of claim 8 wherein the resulting frequency is one of an increased and a decreased frequency.

12. The medium of claim 8 wherein the method comprises adjusting the scaled idle detection metric to: scaled idle detection metric=% of maximum frequency*maximum idle detection metric.

13. The medium of claim 8 wherein the method comprises adjusting the scaled idle detection metric to: scaled idle detection metric=(% of maximum frequency)*maximum idle detection metric.

14. The medium of claim 8 wherein idling the component comprises: determining that the component has entered a period of inactivity; measuring the period of inactivity; determining that the measured period of inactivity exceeds the scaled idle detection metric; and idling the component.

15. A method for performing power management on a component of a computing device based on a processor of the computing device, the processor being operated based on a clock signal oscillating at a frequency, the method comprising adjusting the frequency of the clock signal applied to the processor when warranted and also reducing power usage of the component when the component experiences a period of inactivity longer than an idle detection metric scaled according to the adjusted frequency, wherein adjusting the frequency of the clock signal includes:

obtaining a maximum frequency of the clock signal and a maximum idle detection metric; monitoring the processor;

determining from the monitored processor that the frequency of the clock signal can be adjusted to a resulting frequency that is reduced as compared to the maximum frequency;

determining the resulting frequency; applying the resulting frequency to the clock signal; and adjusting the scaled idle detection metric based on the resulting frequency of the clock signal such that the scaled idle detection metric bears a corresponding relationship with the resulting frequency of the clock signal and is reduced as compared to the maximum idle detection metric, whereby the component is more likely to be inactive for a period that meets the scaled and reduced idle detection metric even though the component is more likely to experience shorter periods of inactivity when the frequency of the clock signal is reduced as compared to the maximum frequency.

16. The method of claim 15 comprising: determining the resulting frequency as a percentage of the maximum frequency of the clock signal (% of maximum frequency); and adjusting the scaled idle detection metric based on such % of maximum frequency as applied to the maximum idle detection metric.

17. The method of claim 16 comprising adjusting the scaled idle detection metric to: sealed idle detection metric=% of maximum frequency*maximum idle detection metric.

18. The method of claim 16 comprising adjusting the scaled idle detection metric to: scaled idle detection metric=(% of maximum frequency)*maximum idle detection metric.

* * * * *